United States Patent [19]
Bertram

[11] Patent Number: 4,716,598
[45] Date of Patent: Jan. 5, 1988

[54] HEAT-INSULATING FABRIC ARTICLES

[76] Inventor: Jane K. Bertram, Grimston, Melton Mowbray, Leicestershire LE14 3BZ, England

[21] Appl. No.: 656,983

[22] Filed: Oct. 2, 1984

[30] Foreign Application Priority Data

Oct. 12, 1983 [GB] United Kingdom ............... 8327334

[51] Int. Cl.$^4$ .......................... A41D 1/02; A41D 1/00
[52] U.S. Cl. .............................................. 2/108; 2/97; 2/102
[58] Field of Search ............... 2/108, 97, 95, 96, 93, 2/102; 428/71, 76, 313

[56] References Cited

U.S. PATENT DOCUMENTS

| | | |
|---|---|---|
| 2,884,639 | 5/1959 | Klepper ................................. 2/97 |
| 3,116,489 | 1/1964 | Weiss ..................................... 2/97 |
| 3,950,789 | 4/1976 | Konz et al. ........................... 2/97 |

Primary Examiner—Doris L. Troutman
Attorney, Agent, or Firm—Charles A. Brown; Charles E. Brown

[57] ABSTRACT

The invention describes heat-insulating fabric articles, for example a jacket, comprising an outer layer (17) preferably of synthetic material such as woven nylon, and a lining (19) joined together by a network of quilting seams (3) to form pockets. Each pocket is filled with closed polystyrene beads (21) so that movement between the beads is possible but migration of the beads to other regions of the pocket is inhibited. Such a garment is heat-insulative even when wet, and when dry promotes the formation of a static charge in the interstices between the beads.

7 Claims, 3 Drawing Figures

U.S. Patent    Jan. 5, 1988    Sheet 1 of 2    4,716,598
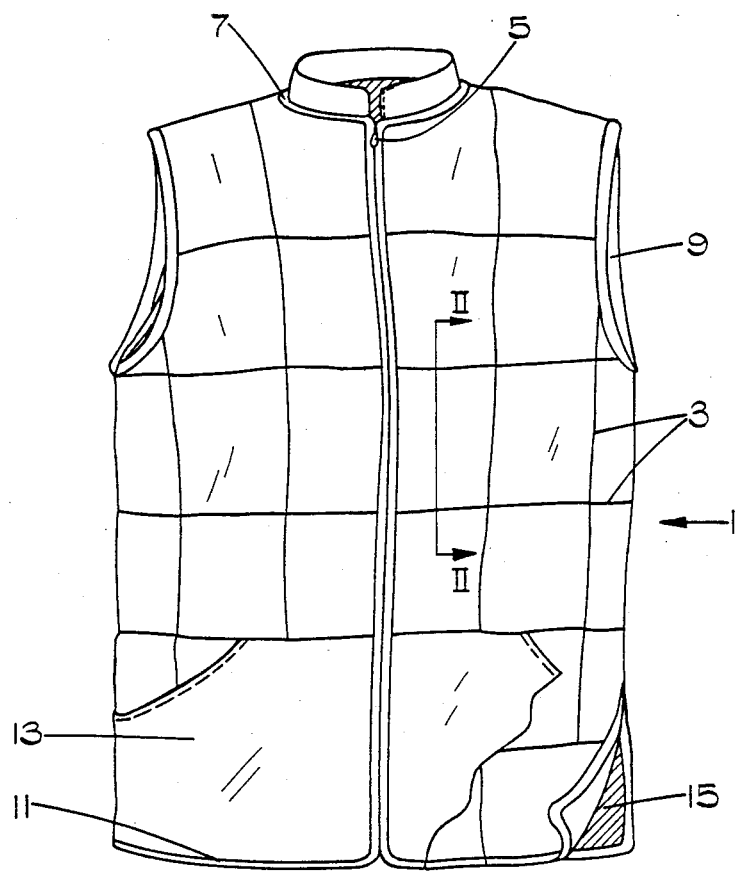
FIG.I.
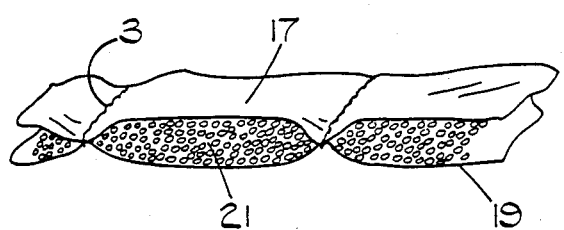
FIG.2.

HEAT-INSULATING FABRIC ARTICLES

The present invention relates to heat-insulating fabric articles, for use as garments or other body contacting devices for use by humans or animals.

Conventional garments often have poor thermal insulating qualities so leading to loss of body heat by the wearer. Previous attempts to improve the thermal insulating qualities of garments have comprised providing extra thickness by way of filling or padding the space between an outer layer of the garment and an inner lining. The padding often comprises synthetic or natural textile fibres or feathers and a quilted construction is frequently employed to prevent free movement of the filling and so avoid "cold spots". Such garments are often bulky and cumbersome for the wearer if effective thermal insulation is provided and are thus often impractical when, for example, in the form of jackets for use in active pursuits such as climbing or sailing. Additionally, the textile fibres or feathers become waterlogged when wet thus considerably reducing the insulating qualities. These attempted solutions have not provided satisfactory garments for wide scale use.

One of the several objects of the present invention is to provide improved thermal insulating qualities whether the garment or article is wet or dry and also to aid the buoyancy of a garment when worn in water.

The invention has a further object of providing a garment or article having the facility to enhance the beneficial effect of the warmth of body heat and of movement of the body of the wearer.

Accordingly, in its broadest aspect, the invention provides a heat-insulating fabric article comprising at least two layers of flexible fabric secured together by a plurality of spaced apart seams arranged in a network across the fabric to form columns or rows of pockets, wherein said pockets are each substantially filled with closed particles of polystyrene the amount of polystyrene filling in each pocket being sufficient to occupy the space therein to permit movement of the particles one against the other but to resist migration thereof to other regions of the pocket.

The garment is preferably made from a lightweight but durable synthetic textile fabric and is of a quilted construction which prevents undue movement and "bulking" of the polystyrene particles, which are preferably in bead form.

In one preferred embodiment of the invention, the garment is a sleeveless jacket of quilted construction in which the filling or padding in each quilted section or pocket comprises partially expanded polystyrene beads of small size in relation to the size of the quilted pocket the amount of beads being just sufficient substantially to fill the pocket and thus avoid them settling in the bottom of each pocket. The pockets should not be overfilled since to do so would prevent desirable movement or rubbing together between adjacent beads and between beads and the fabric of the garment layers. Preferably the fabric of these layers will be selected to encourage the occurence of an electrostatic charge in the interstices between the beads.

In another preferred embodiment of the invention, the garment is a horse rug or coat of similar quilted construction to the first mentioned embodiment. Ideally, the horse rug should be of sufficient dimensions so as to provide for a double breasted construction and thus ensure good insulation at the animal's bronchial areas.

Use of polystyrene beads has several advantages in that they provide an effective insulating means without being too bulky. In addition, they reflect body heat, are lightweight, and do not absorb moisture. They provide buoyancy, are hygenic in use and sustain an electrostatic charge which is thought to relieve pain and muscular discomfort for the wearer.

The electrostatic charge also tends to assist in holding the polystyrene beads apart from each other thus further avoiding bulking of the filling. It has been found that the extent to which the electrostatic is formed is determined at least in part by the nature of the fabric of the garment. For example, a garment of cotton material will promote a low charge level whereas a synthetic material such as nylon will promote a negative charge at an appreciably higher level.

The polystyrene beads may be of a fire retardant grade for added safety.

Where the polystyrene beads are used for filling in a garment which is likely to be immersed, for example, a yachting jacket, it will be found that the garment assists considerably in the retention of body heat. It is in this respect superior to conventional so-called thermal garments the heat-retaining properties of which are less than satisfactory when wet.

The present invention is further described hereinafter, by way of example., with reference to the accompanying drawings, in which:

FIG. 1 shows one embodiment of the invention in the form of a sleeveless jacket;

FIG. 2 shows a cross-section on the line II—II of FIG. 1, illustrating the filling of the quilted jacket.

Figure 3:
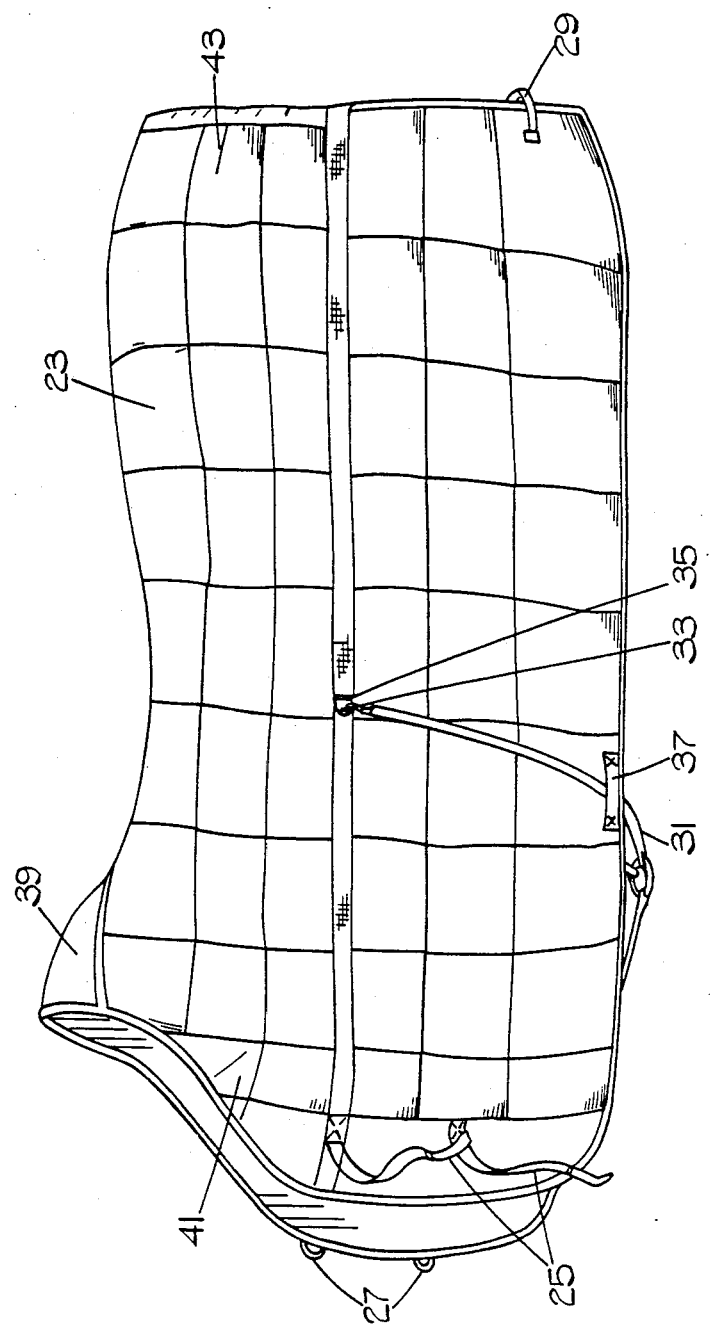
FIG. 3 shows another preferred embodiment of the invention in the form of a horse rug or coat.

In FIG. 1 a jacket 1 is provided with a quilted construction by means of seams 3 with a zipper closure at the front of the garment. An arm edging strip 7, a neck edging strip 9 and edge 11 of the garment are seamed with an edging tape. The garment is provided with patch pockets 13 which in the present example are not of quilted construction. At each side of the garment is a vent 15 to facilitate body movement of the wearer.

In FIG. 2 a cross section on II—II in FIG. 1 shows an outer layer 17, which in the present example is of woven nylon, and an inner lining 19 of the garment, with polyester beads 21 filling the space in each quilted pocket. It will be observed that the beads are arranged to fill the space or pocket but not to overfill to the point where undue distortion of the pocket occurs.

In FIG. 3 a horse rug is provided with a quilted construction 23. Straps 25 are stitched directly to the body of the horse rug and the rug is secured to the animal by passing the straps through loops 27 and either tying them or otherwise securing them. The straps 29 are also stitched directly to the horse rug and are secured in a similar fashion through loops on the opposite side of the horse rug, but not shown in the illustration. Straps 31 also assist in securing the rug to the animal and these are fixed to the rug by a clip 33 fastening into a D-ring 35 and passing through loops 37. Extra padding is provided in the area 39 of the withers. Draw strings 41 and 43 facilitate a neat fit of the rug to the animal.

Whilst the present invention had been particularly described with reference to a sleeveless jacket and a horse rug, it will be obvious to those skilled in the art that the invention has applications for many types of garments, including garments for animals, and other devices such as sleeping bags, survival bags, quilts and the like.

I claim:

1. A heat-insulating fabric article comprising at least two layers of flexible fabric secured together by a plurality of spaced-apart seams arranged in a network across the fabric to form columns or rows of pockets, wherein said pockets are each substantially filled with closed particles of polystyrene the amount of polystyrene filling in each pocket being sufficient to occupy the space therein to permit movement of the particles one against the other but to resist migration thereof to other regions of the pocket.

2. An article as claimed in claim 1 wherein the two layers comprise an outer layer and a lining respectively of a garment.

3. An article as claimed in claim 2 wherein the garment is a jacket.

4. An article as claimed in any one of claims 1 to 3, wherein the closed particles comprise polystyrene beads.

5. An article as claimed in claim 4, wherein the polystyrene of the beads is partially expanded.

6. An article as claimed in any one of the preceding claims 1–5 wherein at least one fabric layer is of synthetic material.

7. An article as claimed in claim 6 wherein the synthetic material is nylon.

* * * * *